United States Patent
Callaway, Jr. et al.

(10) Patent No.: US 8,385,932 B2
(45) Date of Patent: Feb. 26, 2013

(54) TECHNIQUE AND APPARATUS FOR COGNITIVE RADIO ACCESS TO A BROKERED SPECTRUM

(75) Inventors: Edgar H. Callaway, Jr., Boca Raton, FL (US); David B. Taubenheim, Plantation, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 855 days.

(21) Appl. No.: 12/415,864

(22) Filed: Mar. 31, 2009

(65) Prior Publication Data

US 2010/0248764 A1 Sep. 30, 2010

(51) Int. Cl.
*H04W 72/04* (2009.01)

(52) U.S. Cl. ..................... 455/452.2; 370/329

(58) Field of Classification Search .......... 455/450, 455/451, 452.1, 452.2, 464, 465, 466, 507, 455/509, 511, 512, 513; 375/132, 462; 370/329
See application file for complete search history.

(56) References Cited

U.S. PATENT DOCUMENTS

| | | | |
|---|---|---|---|
| 7,436,788 B2 * | 10/2008 | Huschke et al. | 370/310 |
| 8,060,104 B2 * | 11/2011 | Chaudhri et al. | 455/452.1 |
| 8,139,496 B2 * | 3/2012 | Stanforth et al. | 370/252 |
| 8,145,230 B2 * | 3/2012 | Callaway et al. | 455/452.2 |
| 2005/0128971 A1 | 6/2005 | Huschke et al. | |
| 2006/0083205 A1 | 4/2006 | Buddhikot et al. | |
| 2007/0211680 A1 | 9/2007 | Laroia et al. | |
| 2008/0130519 A1 | 6/2008 | Bahl et al. | |
| 2009/0074032 A1 | 3/2009 | Callaway, Jr. et al. | |
| 2009/0207800 A1 * | 8/2009 | Shan et al. | 370/329 |
| 2011/0032892 A1 * | 2/2011 | Bahl et al. | 370/329 |

OTHER PUBLICATIONS

PCT/US2008/075856—International Search Report—Written Opinion—Mailing Date, Mar. 29, 2009.
Ian F. Akyildiz et al., "NeXt generation/dynamic spectrum access/cognitive radio wireless networks: A survey", Computer Network, vol. 50, 2006—pp. 2127-2159.
Buddhikot, M.M.; Kolodzy, P.; Miller, S.; Ryan, K.; and Evans, J., "DIMSUMnet: new directions in wireless networking using coordinated dynamic spectrum," Sixth IEEE International Symposium on a World of Wireless Mobile and Multimedia Networks, Jun. 13-16, 2005, pp. 78-85.
Hoon Kim; Yeonwoo Lee; and Sangboh Yun, "A dynamic spectrum allocation between network operators with priority-based sharing and negotiation," IEEE 16th International Symposium on Personal, Indoor and Mobile Radio Communications, vol. 2, Sep. 11-14, 2005, pp. 1004-1008.

(Continued)

*Primary Examiner* — Blane J Jackson
(74) *Attorney, Agent, or Firm* — Barbara R. Doutre (57) ABSTRACT

A technique (300) and apparatus for sharing frequency spectrum amongst cognitive radios, without the use of a centralized control, is provided. By determining open segments of available spectrum within a brokered spectrum (306), and determining costs associated with those available segments (307), a CR device can identify an optimal spectral portion (308) within which to transmit (314) and grow (342) a narrowband signal. The occupied bandwidth growth is monitored such that cost associated with the growth does not exceed a cost threshold (341).

21 Claims, 5 Drawing Sheets

OTHER PUBLICATIONS

Choi, Moun, Patel, Maulin, Venkatesan, S., "A Full Duplex Multi-channel MAC Protocol for Multi-hop Cognitive Radio Networks". 1st International Conference on Cognitive Radio Oriented Wireless Networks and Communications,—IEEE Jun. 2006—5 pages.

Thoppian, M., Venkatesan S., Prakash R., Chandrasekaran R.—MAC-layer Scheduling in Cognitive Radio based Multi-hop Wireless Networks—International Symposium on a World of Wireless, Mobile and Multimedia Networks—IEEE Jun. 2006—10 pages.

International Preliminary Report on Patentability and Written Opinion for counterpart International Application No. PCT/US2008/075856 mailed on Apr. 1, 2010.

Non Final Office Action mailed May 30, 2012 in related U.S. Appl. No. 11/857,911, Edgar H. Callaway Jr., filed Sep. 19, 2007.

Perkins, C., E., and Royer, E., M., "Ad hoc On-Demand Distance Vector Routing." Proceedings of the 2nd IEEE Workshop on Mobile Computing Systems and Applications, Feb. 1999, pp. 90-100.

* cited by examiner

321
NO FENCE
QUANTA

323
BW = BW - 2

325
BW = BW - 1

327

329
YES FENCE
QUANTA

331
TWO FENCE
QUANTA

333
EXACTLY ONE
FENCE
QUANTUM

335
Tg = 0,
BW = BW + 2

337
Tg ≠ 0,
BW = BW - 1

339
Tg = 0,
BW = BW
FENCE
QUANTUM
SHIFTS

*FIG. 4*

TECHNIQUE AND APPARATUS FOR COGNITIVE RADIO ACCESS TO A BROKERED SPECTRUM

CROSS REFERENCE TO RELATED APPLICATIONS

This application is related to U.S. patent application No. 11/857,911, filed Sep. 19, 2007, entitled "DISTRIBUTED SPECTRUM ALLOCATION SCHEME FOR COGNITIVE RADIO" and assigned to a common assignee.

TECHNICAL FIELD

This invention relates in general to communication systems and more particularly to spectrum access for cognitive radio systems.

BACKGROUND

Radio communication is becoming increasingly widespread and used for a variety of communication purposes. As a result, the demand for radio frequency spectrum is likewise increasing. The concept of secondary-use radio systems has been proposed as a way of addressing radio spectrum demand. Secondary-use systems operate in the unused channels or spectrum portions of spectrum regions reserved for primary operators. Primary operators, or incumbents, are generally licensed to use a spectrum portion, such as a channel, and include entities such as television, commercial radio broadcasters, auxiliary broadcasting services (e.g. wireless microphones), radio-telephone operators, and land-mobile radio systems. Secondary use of spectrum is generally achieved though the use of cognitive radio techniques. While the CR concept is generally intended to enable frequency band sharing and reuse with incumbent users and/or other CR devices, the optimum use of spectrum already cleared of incumbent users is of particular interest to CR devices seeking to operate within the cleared spectrum.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward. Drawings are for illustrative purposes only and not intended to be to scale.

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational terms, if any, such as first, second, top and bottom, front and rear and the like are used solely for distinguishing one entity or action from another, without necessarily requiring or implying any such actual relationship or order between such entities or actions.

For the purposes of this application the term "bandwidth" is defined as the spectrum occupied by a transmitted signal, and is not intended to be equated to the term "data rate" which is the number of bits transmitted per unit time. For the purposes of this application, the term band-edge is defined as an outer spectral edge of a transmitted signal's bandwidth. For the purposes of this application, the term "spectral quantum" is defined as the smallest spectral bandwidth that a CR device may occupy or, equivalently, the smallest amount by which the bandwidth of a CR device may be changed. The term "fence quanta" of a device is defined as the spectral quanta immediately above and below (in frequency) the transmitted signal of a device, and is not intended to be equated to the term "guard-band", which is/as used in/refers to the unused bandwidth separating channels, employed, for example, to ensure that they do not interfere with one another. It is possible to have a single fence quantum on only one side of a transmitted signal, the other side of the transmitted signal's bandwidth abutting an adjacent signal's bandwidth. It is also possible to have no fence quanta present around a transmitted signal, and both sides of the transmitted signal's bandwidth abutting an adjacent signal's bandwidth. For the purposes of this application, a narrowband signal is considered to be a signal having the width of one spectral quantum. Finally, for the purposes of this application the term "cost" is defined as what must be given or done or undergone to obtain something of value, e.g., spectrum access. Cost may be pecuniary or monetary, or may take other forms, such as power consumption or message latency, that are relevant to wireless devices. It may also be a function of one or more of these parameters.

While a cognitive search technique that introduces a signal having the width of a spectral quantum into available spectrum is known and does provide a useful way to enable cognitive radios to share spectrum equitably, the technique treats all different portions of available spectrum in the same manner; that is, the advantages and disadvantages of different portions of spectrum are not considered. In many practical instances however, some portions of available spectrum may be more desirable than others. For example, in systems that utilize spectrum brokering, the spectrum broker is free to charge the user different fees for the use of different portions of spectrum. The spectrum broker may wish to encourage users to stay as far away as possible from a sensitive fixed user, or charge more for spectrum in greater demand. As an example of the latter, Wi-Fi Channel 1 is particularly popular because it is the first channel checked for occupancy in most search techniques, even though there is no performance difference between Wi-Fi channel 1 and other Wi-Fi channels. Hence, a user may inadvertently increase usage within high-cost spectrum areas thereby incurring higher spectrum costs than desired.

Even if the broker's fee is the same for all portions of available spectrum, the user himself may prefer to use certain areas of spectrum over others. For example, a user knowing the search techniques of other users may wish to remain in an optimal spectral location for fast discovery. Additionally, there may be radio frequency (RF) performance reasons, such as low noise floor, avoidance of intermodulation distortion products, or the like, to prefer some areas of spectrum over others. The user may even desire to remain in a particular location in the frequency domain for duplexing or multiple-access purposes and be willing to pay more for that purpose. The user may prefer one portion of spectrum over another in order to maintain improved battery life and therefore be willing to pay a higher cost for that portion of available spectrum. Briefly, and in accordance with the present invention, there is provided herein a method and apparatus for achieving fair channel access among cooperating, yet independent, cognitive radio (CR) devices, by taking into account that different portions of available spectrum may be more desirable than others.

A distributed channel access technique, achieved without the use of a centralized control, is provided herein by considering the relative desirability of spectral areas in a spectrum-brokered environment prior to introducing a signal bandwidth variable into the channel access technique. Optimized spectrum sharing by independent CR devices is achieved by introducing a signal having the width of a spectral quantum into optimal available spectrum selected based on predetermined criteria (e.g., tolerable or budgeted cost). The signal bandwidth is then grown within the selected portion of spectrum, rapidly at first and then slowing the rate of growth as occupied bandwidth increases. By maintaining an unoccupied spectral quantum between each CR device's transmission signal, the technique ensures that a device just beginning transmissions in the CR frequency band will have spectrum from which to start growing (up to the maximum the spectrum can support, when the bandwidth of each device has been reduced to one spectral quantum, and there is no available spectral quanta left).

The channel access technique of the present invention applies to cognitive radio applications. The technique starts by determining the most desirable portion of available (free/idle) spectrum (e.g., the portion that most closely satisfies a tolerable or budgeted cost for the transmission) within a brokered spectrum. Within the brokered spectrum, open spectrum is made available by authorized regulatory bodies, brokers, broker's agents, or other approved parties. CR devices may sample the spectrum or query a database to determine open frequency spectrum segments within the brokered spectrum.

Cost information pertaining to open spectrum can be made available to the CR device in a variety of ways. The cost of open spectrum may have been made available previously, by the broker or agent, and stored within the CR device. The cost associated with open spectrum may be acquired in real time by the CR device from the broker or agent. The cost of open spectrum may also be negotiated or traded off between CR device, the broker, agent and other parties, or even the CR user. The cost of open spectrum may vary over time and CR devices may request or automatically receive notifications of cost variation or cost changes from the broker or agency. Cost variations may also exist due to certain cost criteria having more importance to one CR user than another. For example, in addition to straight spectrum fees, cost criteria relative to radio discovery, RF performance, radio operating mode, and battery life conservation may likewise be taken into account by a CR device. Hence, a CR user may be willing to pay more for a particularly desirable portion of spectrum where the device can operate with better performance, or the CR device user may be willing to pay less and take a performance tradeoff in another portion of open spectrum.

Once the CR device identifies the most cost desirable portion of spectrum, the CR device transmits a narrow-bandwidth signal, one spectral quantum in width, within the most desirable portion of available spectrum. The technique then grows the transmitted occupied bandwidth over time, at a rate that is a monotonically decreasing function of the occupied bandwidth, until either (a) there is only one spectral quantum (a fence quantum) between the device and each of its adjacent spectral neighbors, or (b) a cost of the increased bandwidth exceeds a tolerable or budgeted amount set to a predetermined cost threshold. It is noteworthy to point out that the growth rate is a function of the occupied bandwidth, not time. Although the growth rate and bandwidth are related during the growth phase, these parameters are not related in the steady state, where the bandwidth may stay substantially constant indefinitely as time moves on.

While the growth process continues (meaning that the fence quanta will be occupied by the transmitting device from time to time), a second process begins, in which the fence quanta are monitored prior to each transmission. Should the fence quanta be found occupied, the device reduces its occupied bandwidth during its next transmission so as to recreate a fence quantum between the device and each of its spectrally adjacent neighbors.

If the device occupies less bandwidth than one of its neighbors, it will occupy the fence quantum more often than the larger neighbor (since the growth rate is a decreasing function of occupied bandwidth). The present device will therefore cause the larger spectral neighbor to reduce its occupied bandwidth more often, while the present device increases its occupied bandwidth. A comparison is made to ensure that the growth to the bandwidth does not cause a CR device to exceed the predetermined cost threshold.

The technique therefore works to produce an economic equilibrium, in which devices with higher cost tolerances "spend" proportionally more for the spectrum they occupy—either by occupying a larger bandwidth, or by paying more for an equivalent bandwidth of more costly, but more desirable, spectrum.

If the cost of each spectral quantum is the same, the technique works to give each user an occupied bandwidth proportional to his tolerance of spectrum cost. If all users have the same tolerance to cost, the technique therefore works to equalize the occupied bandwidth of all users. If the users have differing cost tolerances, each user will have an occupied bandwidth proportional to his tolerance; in other words, each user receives bandwidth in proportion to his means.

Figure 1:
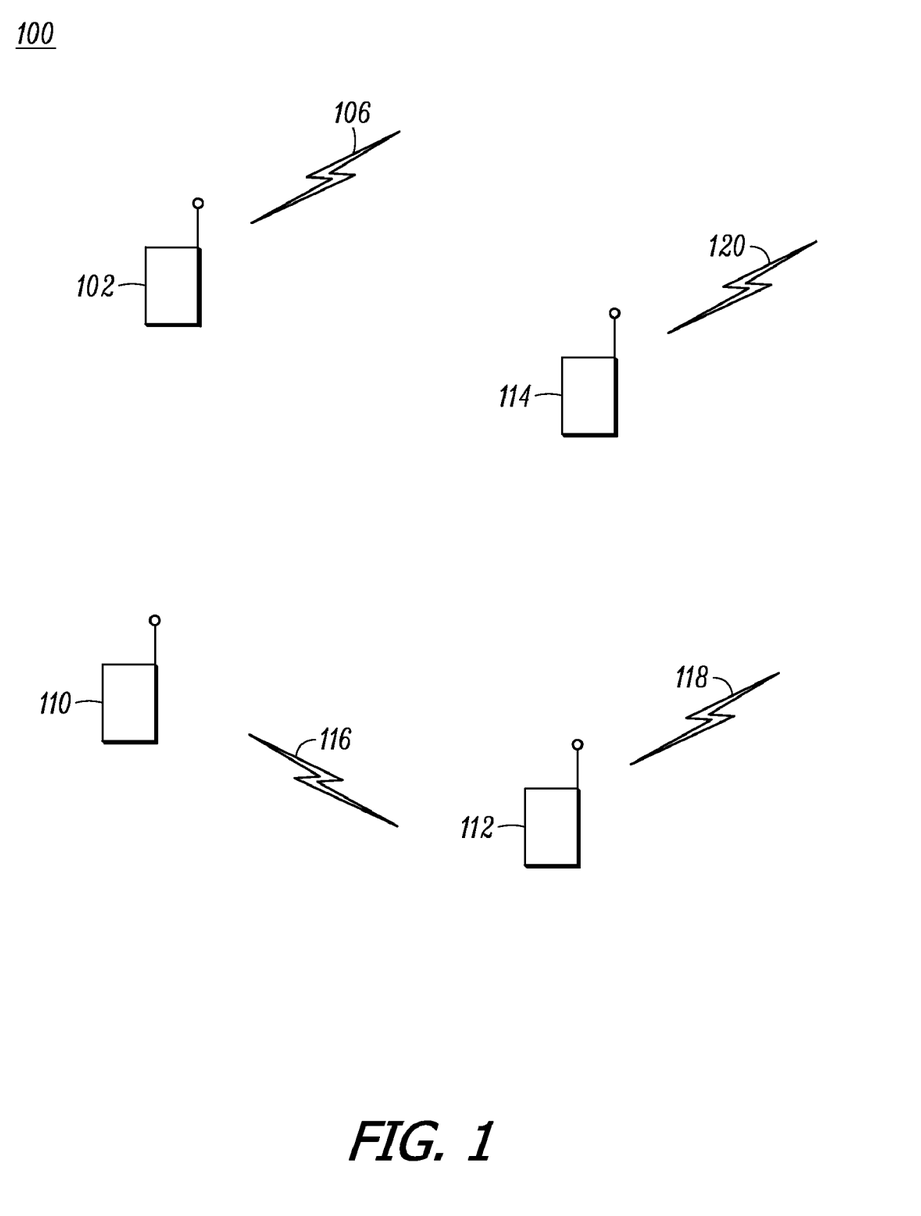
FIG. 1 is a plurality of cognitive radio (CR) devices operating in accordance with various embodiments of the invention.
Figure 2A:
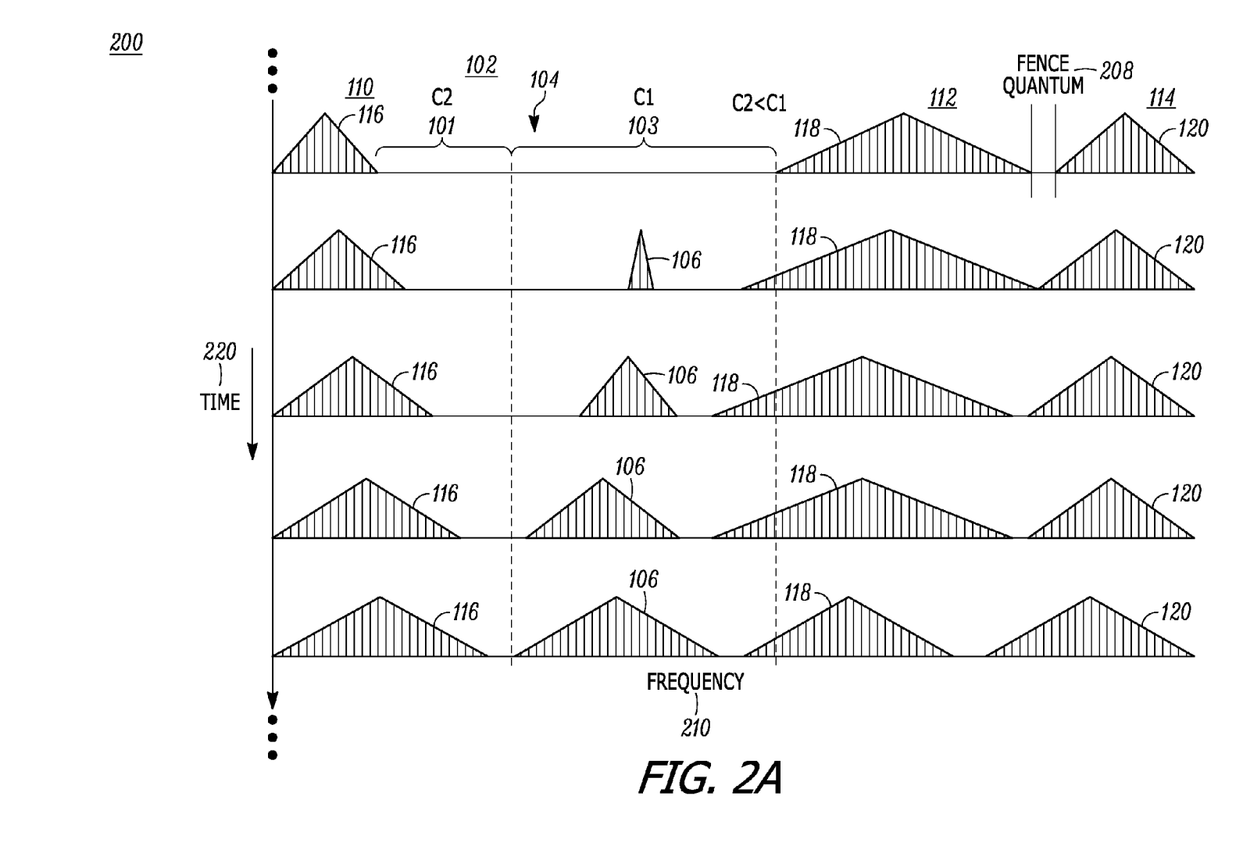
FIG. 2A is illustrates an example of trading bandwidth over time to achieve a steady state operation when cost of spectrum segments is non-uniform in accordance with various embodiments of the invention.

Referring to FIG. 1, there is shown a plurality of active cognitive radio (CR) devices 100. FIG. 2 illustrates an example of trading bandwidth frequency 210 over time 220 to achieve an economic equilibrium for a CR device within a brokered spectrum based on cost criteria in accordance with various embodiments of the invention. Referring to FIGS. 1 and 2A, the plurality of CR devices 100 may be part of the same network communicating with each other or may be independent devices from different services, users, owners, etc. The plurality of CR devices are represented by active CR devices 102, 110, 112, 114, each active CR transmitting signals 106, 116, 118 and 120 respectively. In accordance with this embodiment of the invention, each CR device is capable of identifying open frequency spectrum and selecting, based on cost criteria, an optimal portion of frequency spectrum and then transmitting a narrowband signal, one spectral quantum in width, within the portion of the selected frequency spectrum. As seen in FIG. 2A, CR devices 110, 112, 114 are already in the process of adjusting/widening their respective signals. CR device 102 samples the frequency spectrum and senses open frequency segment 104. The open frequency segment 104 is a frequency segment being brokered by an entity authorized by a relevant regulatory body, or his agent. Within segment 104 different portions of frequency spectrum are identified based a cost criteria. The cost criteria may be for example, spectrum broker fees associated with the portion, cost associated with channel usage within the portion, cost associated with spectral location, cost associated with RF performance expected to be achieved within the portion, or radio operating mode cost associated with the portion.

In the embodiment shown in FIG. 2A, CR device 102 is selecting spectrum based on the cost criteria of spectrum fees. CR 102 determines that within open frequency spectrum 104 spectrum portions 101 and 103 have differing spectrum costs, C1 and C2, with C2 having a lower cost than C1. As such CR device 102 introduces transmission signal 106 into spectrum portion 103.

CR 102 transmits signal 106, one spectral quantum in width, preferably within a center of the selected spectrum portion 103, as shown in the second time instance of 220. Each CR device widens its signal until either a fence quantum 208 is reached, or the spectrum cost exceeds a tolerable or budgeted amount. If the former, the fence quantum 208 separates each active CR device's transmission signal from adjacent spectral neighboring transmission signals on either side. The neighboring active CR devices 110, 112 and other CR device 114 attempt to increase their respective bandwidths at rates that are a function of each CR device's occupied bandwidth, while decreasing their respective bandwidths when necessary to maintain their fence quanta 208, such that, over time 220, the bandwidth amongst all the active CR devices 102, 110, 112, 114 equilibrate with fence quanta 208 therebetween. If the latter, bandwidth amongst all the active CR devices 102, 110, 112, 114 is limited by their sensitivity to spectrum cost, and idle spectrum remains available for additional users.

Figure 2B:
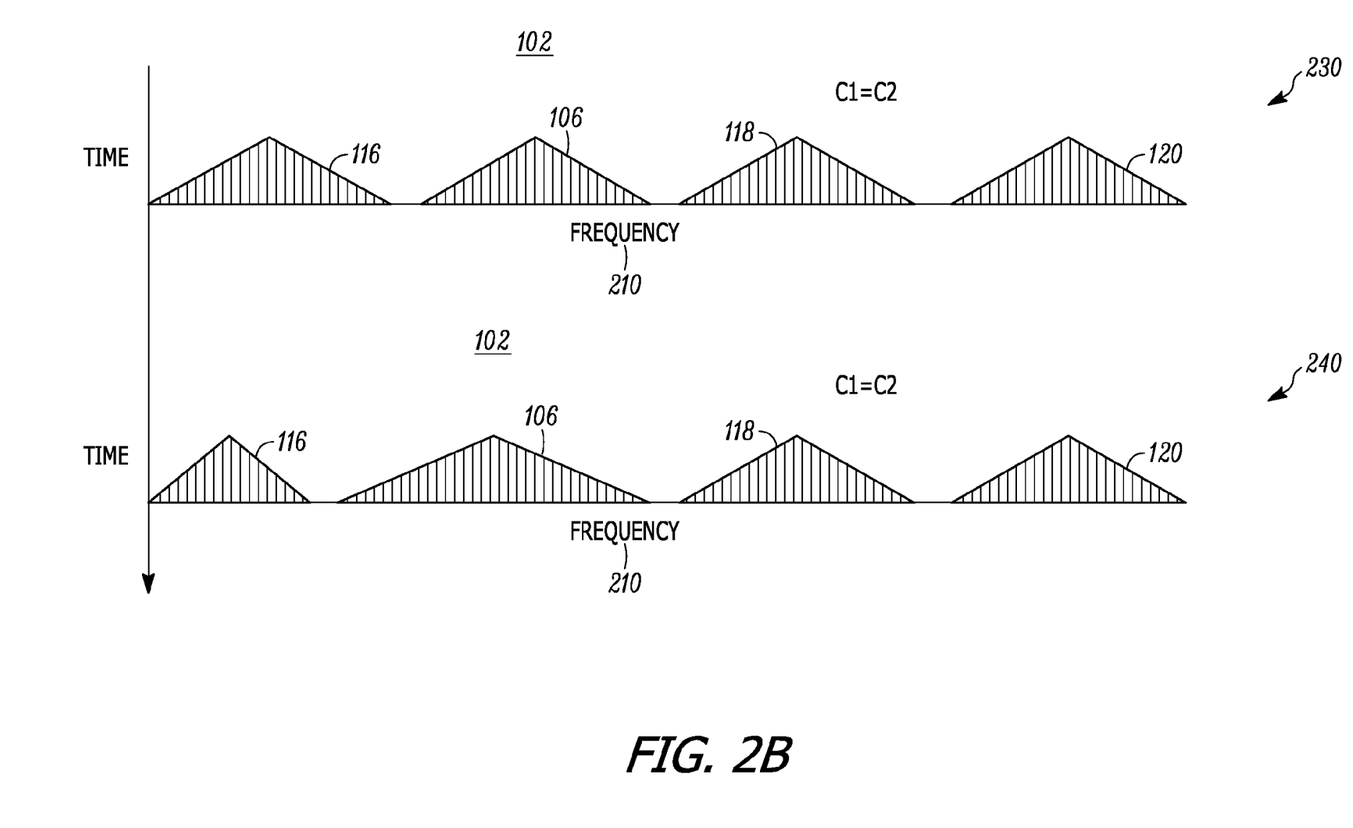
FIG. 2B is illustrates an example of trading bandwidth over time to achieve a steady state operation when cost of spectrum segments is uniform in accordance with various embodiments of the invention.

If the spectrum is all the same price then the bandwidth is limited by the device's sensitivity to cost. If the devices all have the same sensitivity to cost, then the bandwidth is limited by the varying price of spectrum. If the devices have varying sensitivity to cost and the spectrum is of varying price, an economic equilibrium will be reached. Referring to FIG. 2B there is shown an example in which the spectrum cost is uniform and the occupied bandwidth of each CR device is equalized for all of the CR devices when all of the CR devices have the same cost tolerance 230. Referring to 240, CR device 102 has a greater cost tolerance than other devices so its occupied bandwidth 106 is greater than that of the other devices even though the spectrum cost is uniform.

Continuing to refer to FIGS. 1 and 2A, in accordance with another embodiment of the invention, the growth rate and starting bandwidths of each CR device 102, 110, 112, and 114 may vary to accommodate different quality of service (QoS) requirements for each CR device. Again, to achieve channel access among the cognitive radio devices 102, 110, 112, 114 control is distributed amongst the CR devices, without the use of a single centralized control. By verifying the QoS requirements for the CR devices, equal sharing of spectrum is provided to the CR having equal QoS requirements. In cases where the QoS are not equal, spectrum is assigned to the CR devices with weighted proportion to each CR device's QoS needs. A distributed channel access technique is thus provided that, in the steady state, produces substantially equal sharing of spectrum among CR devices having QoS requirements. A device with higher QoS requirements can have those requirements met by two mechanisms. Firstly, the growth rate of high-QoS devices can be accelerated, and secondarily these devices can start from a larger initial occupied bandwidth (i.e., several spectral quanta). Since the fence quanta are (almost) always available, new devices entering the system will always have a place in the spectrum from which to start growing.

Figure 3:
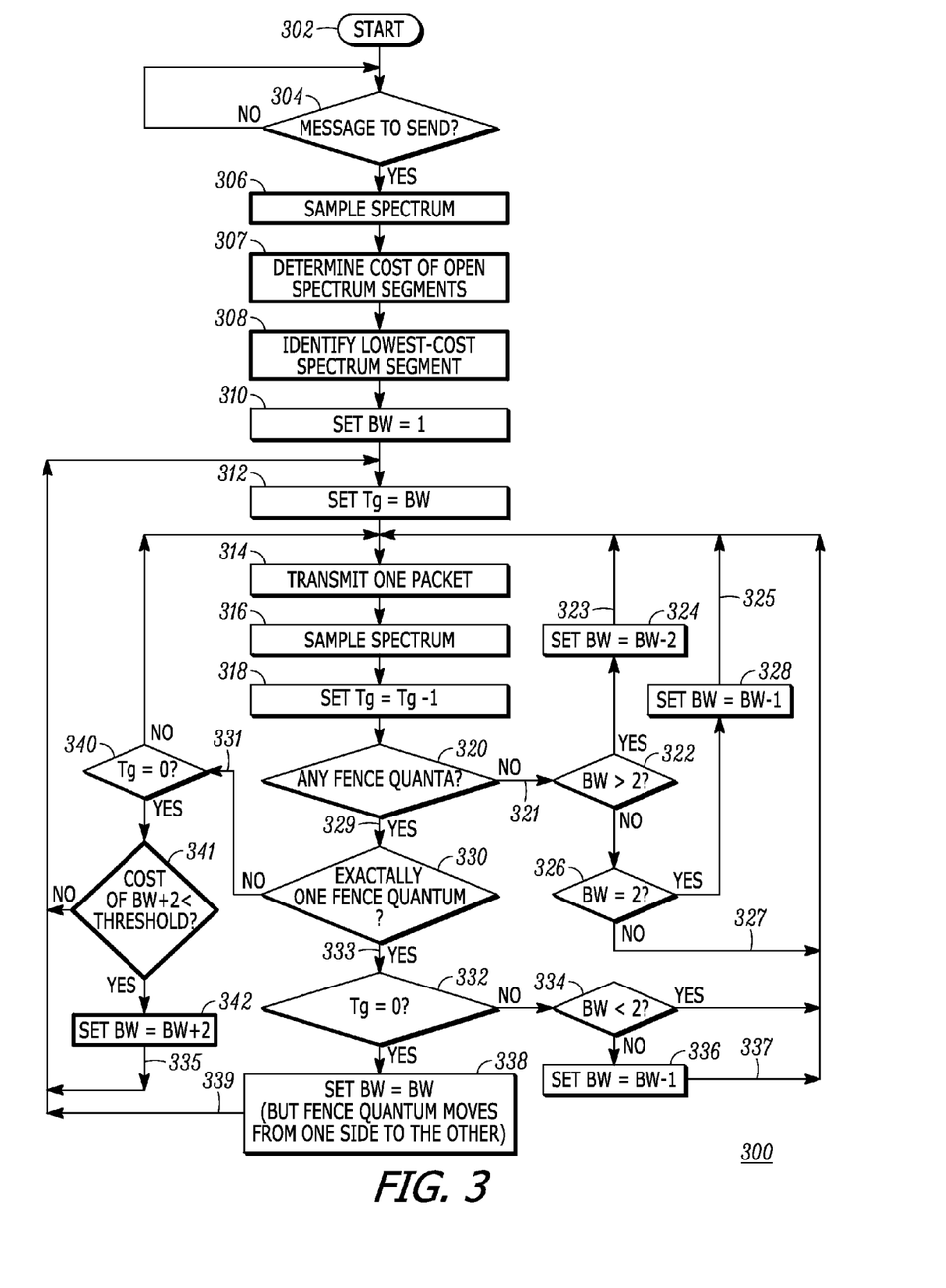
FIG. 3 is a technique for a cognitive radio to share spectrum with other cognitive radios in accordance with various embodiments of the invention.

FIG. 3 is a technique for a cognitive radio to share spectrum with other cognitive radios in accordance with an embodiment of the invention. Technique 300 begins at 302 with a CR device, such as CR device 102, determining that it desires to send a message at 304. Upon determining to send a message at 304, the CR device 102 determines open frequency spectrum segments either by sampling the spectrum or, alternatively, querying a database. The cost of the open frequency segments is determined at 307. The cost associated with the open frequency segments can be determined by the CR device in a variety of ways including being pre-stored in a database internal to the CR device, acquired real time by the CR device from broker or agent queries, and/or negotiated or traded off between the broker, agent and CR user himself.

Figure 4:
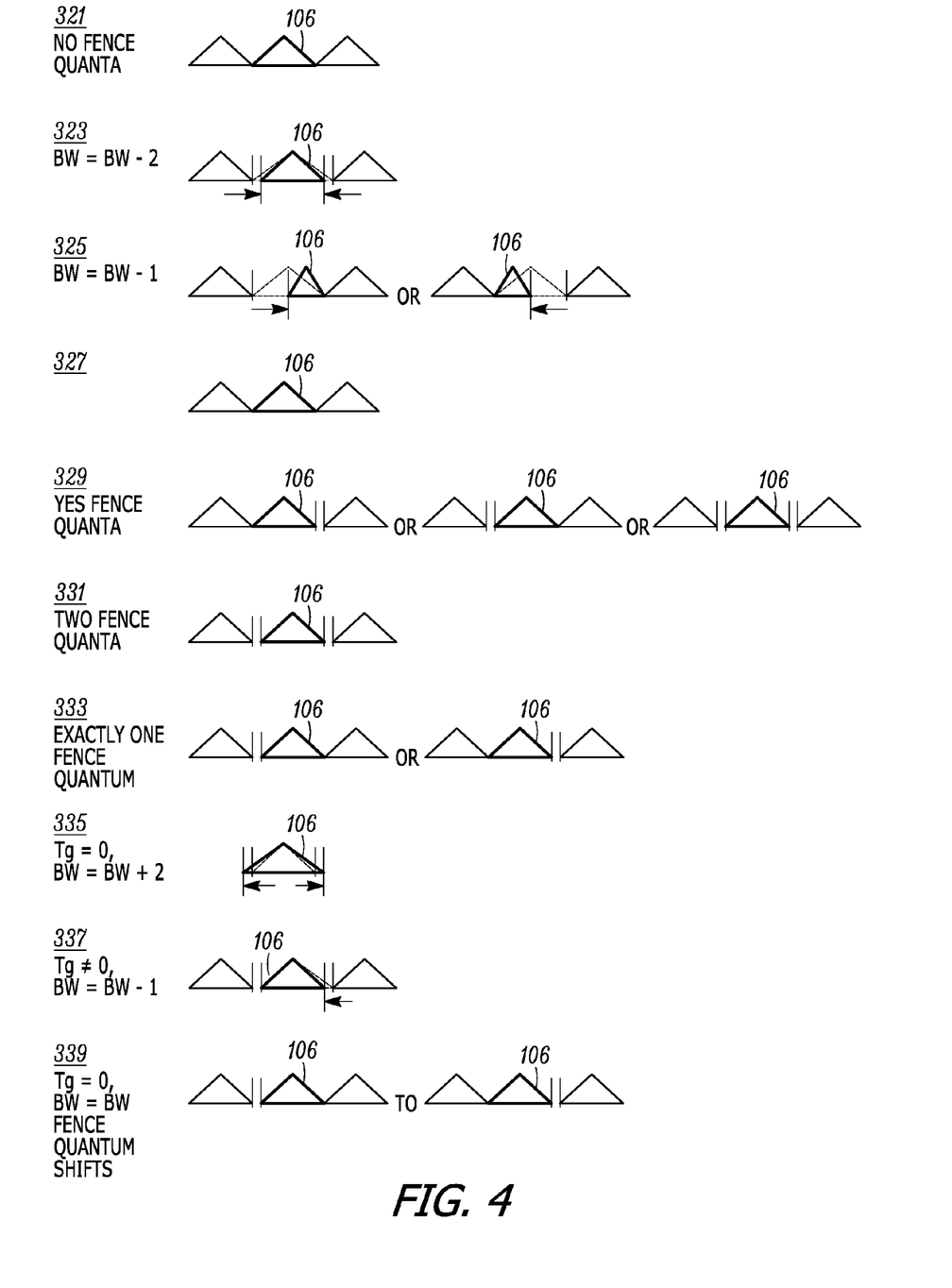
FIG. 4 illustrates examples of various signal bandwidth adjustments and fence locations that may occur throughout the technique of FIG. 3.

CR device 102 then identifies an optimum segment (from a plurality of segments) or optimum portion within a segment based on the cost criteria. CR device 102 then preferably but not necessarily locates the center within the identified portion of the spectrum. Upon identifying this center, the CR device 102 sets the bandwidth for the transmission signal to a narrowband setting having a spectral quantum of one (BW=1) at step 310. A timer for tracking time to grow (Tg) is set to the bandwidth (Tg=BW) at step 312, and the CR device 102 begins transmitting a signal (e.g. a packet), one spectral quantum in bandwidth, at 314 and sampling the spectrum at 316. The growth timer (Tg) is decremented at 318 in response to the packet transmission. The CR device 102 checks the spectrum sampled at 316, checking whether any fence quanta exist at 320. Depending on the existence and amount of fence quanta in the sampled spectrum, the spectrum sharing technique 300 adjusts the transmission signal's bandwidth until the growth counter times out. FIG. 4 will be discussed in conjunction with technique 300 to provide examples of the various signal bandwidth adjustments and fence locations.

If no fence quanta exist at 320, meaning neighboring signals are right next to the transmitted signal, (FIG. 4, 321), then the bandwidth is checked to determine whether it has a spectral quanta greater than two (BW>2) at 322. If the BW spectral quanta is greater than two at 322, then transmitted signal's bandwidth is decreased by a spectral quanta of two at 324 (thus attempting to form fence quanta on either side of the CR 102's transmission signal 106 (FIG. 4, 323). The technique 300 then returns to CR 102 transmitting a new packet at 314.

If at step 322, the spectral bandwidth quanta was not greater than two, but equal to two (BW=2) at 326, then it is only possible to decrement by the spectral bandwidth quanta by one (BW=BW−1) at 328. This will result in fence quanta on either side of transmission signal 106 (FIG. 4, 325).

If the spectral bandwidth is not equal to two spectral quanta at 326, leaving the only possibility that BW=1, then the bandwidth of transmission signal 106 must remain at one (FIG. 4, 327) because one spectral quantum is the minimum possible bandwidth, and a packet is sent at 314.

Returning to step 320, technique 300 considers the scenario when fence quanta exist by checking at 330 whether exactly one fence quantum exists. If exactly one fence quantum does not exist ("no" at 331), meaning there are two fence quanta, then the growth counter is checked at 340. If the growth counter (Tg) has not reached zero at 340, then a new packet is transmitted at 314. If the growth counter has reached zero at 340, then the effect that growing the bandwidth by two spectral quanta (BW+2) will have on the predetermined criteria is compared to a predetermined threshold at 341. For the case of the predetermined criteria being spectrum fees, if the cost of increasing the bandwidth by two causes the spectrum fees to be greater than a predetermined fee threshold, then the growth counter is set to a new bandwidth (Tg=BW) at 312 prior to transmitting a new packet at 314. If the spectrum fees do not exceed the predetermined fee threshold at 341, then the transmission signal's bandwidth proceeds to be increased by two spectral quanta (BW=BW+2) at 342 (FIG. 4, 335). The technique then returns to 312 where the growth counter is set to the new bandwidth (Tg=BW) prior to a new packet being sent at 314.

If the fence quanta is exactly one at 330, this means that a single fence abuts the band-edge on one side of the transmission signal 106 and no fence exists on the other side (i.e. an adjacent signal abuts the transmission signal 106 on the other band-edge) (FIG. 4, 333). The growth counter is then checked at 332, and if the counter has not reached zero, then the bandwidth is checked to see if the bandwidth is less than two spectral quanta (BW<2) at 334.

If the bandwidth is less then two spectral quanta at 334, this is an indication that there is not enough room to decrease the bandwidth of transmission signal 106, and the technique simply returns to 314 to send another packet. If at 334 it is determined that the bandwidth is large enough (i.e. BW is equal to two or greater than two), then the bandwidth is decreased by one spectral quantum at 336 (BW=BW-1) to create a fence quanta on both sides of the transmission signal 106 FIG. 4, 337) prior to transmitting a new packet at 314.

If the growth counter did reach zero at 332, then the bandwidth of the transmission signal 106 remains unchanged at 338, but fence quanta is shifted over such that it is in between the transmission signal 106 and the previously adjacent signal (FIG. 4, 339). The technique 300 then returns to 312 to set the growth counter to bandwidth (Tg=BW) and a new packet is then transmitted at 314.

Accordingly, by maintaining an unoccupied spectral quantum between each CR device, the channel technique operating in accordance with the invention, ensures that a device just beginning transmissions in the CR frequency band will have spectrum from which to start growing. The growth can continue up to the maximum the spectrum can support, when the bandwidth of each device has been reduced to one spectral quantum, and there is no available spectral quantum left.

In the case where QoS parameters are considered, the time to grow (Tg) counter within technique 300 can be set to:

$$Tg=BW/QoS \text{ where } QoS=low=1.$$

The higher the value of the QoS parameter, the lower will be the starting Tg counter value. The Tg counter will thus reach zero more quickly. Over time, therefore, with a high QoS value the decision at step 340 will be "Yes" more often than with a lower value of QoS, leading to step 342 more often, and faster growth. To ensure integer values are achieved for each calculation of Tg, a rounding up mathematical function can be applied, such as Tg=ceil (BW/QoS) thereby ensuring that Tg is always at least one. Thus for example, when BW=7 and QoS=6, then Tg=2.

In another embodiment of the present invention, the transmitting device limits its bandwidth to be less than a predetermined maximum bandwidth threshold. This may be desirable, for example, when the device is incapable of transmitting signals with bandwidths greater than the threshold. In this embodiment, the decision in steps 332 and 340 is augmented to also consider the predetermined threshold. To achieve a "Yes" result in these steps, the growth counter must reach zero and the bandwidth must be less than the threshold; otherwise, the "No" decision is made.

In another embodiment, the growth rate can increase at a rate of one quantum per transmission until a neighboring signal presents itself. Thus, in cases with wide open frequency spectrum, the rate at which a signal is transmitted need not be slowed down until the presence of another signal, separated from the transmitted signal by one fence quanta, presents itself.

While the counter Tg has been described in terms of being decremented to a value of zero, the counter may alternatively be set to another threshold or be incremented to an alternative threshold as well.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A channel access technique for a cognitive radio (CR) device in a cognitive radio system, comprising:
   determining open spectrum segments of a brokered radio frequency spectrum;
   identifying a portion of the open spectrum within which to transmit a narrow-bandwidth signal based on cost criteria;
   transmitting a narrow-bandwidth signal one spectral quantum in width, within the identified portion of spectrum;
   growing the transmitted signal while maintaining the cost criteria within a cost criteria threshold in conjunction with maintaining fence quantum with neighboring spectral devices within the system; and
   trading occupancy of fence quantum with neighboring spectral devices, at a rate inversely proportional to occupied bandwidth.

2. The method of claim 1, wherein the step of determining comprises one of:
   determining open spectrum from a database or sampling spectrum for open spectrum segments.

3. The method of claim 1, further comprising:
   equalizing the occupied bandwidth of all CR devices when each CR user has the same cost tolerance and the cost of open spectrum segments is the same for all CR devices; and
   adjusting the occupied bandwidth to be proportional to each CR user's cost tolerance when CR users have differing cost tolerances.

4. The method of claim 1, wherein the step of equalizing further comprises increasing and decreasing bandwidths to equilibrate fence quanta amongst all the CR devices transmitting signals.

5. The method of claim 4, wherein the step of adjusting comprises limiting bandwidth amongst all the CR devices transmitting signals based on sensitivity to spectrum cost.

6. The method of claim 5, wherein idle spectrum not occupied by current CR users remains available for additional CR users.

7. The method of claim 6, wherein the cost tolerance is based on at least one of spectrum broker cost associated with the open spectrum segments, channel usage cost expected within the open spectrum segments, spectral location cost, cost associated with radio frequency (RF) performance expected to be achieved within the open spectrum segments, cost for radio operating mode usage within the open spectrum segments, and cost associated with battery life within the open spectrum segments.

8. A method for accessing spectrum by a cognitive radio (CR) device, comprising the steps of:
    determining that spectrum has been made available from a spectrum broker;
    determining a lowest cost portion of the available spectrum within which to send a transmission;
    transmitting a narrow-bandwidth signal, one spectral quantum in width, within the lowest-cost portion of available spectrum; and
    growing the transmitted signal as a function of occupied bandwidth.

9. The method of claim 8, wherein the step of growing comprises:
    growing the transmitted signal occupied bandwidth until either:
    (a) there is only one spectral quantum between the CR device's transmitted signal and each of its adjacent spectral neighbors; or
    (b) a cost of the increased bandwidth exceeds a predetermined cost threshold.

10. The method of claim 8, wherein the step of growing comprises growing the transmitted signal at a rate that is a monotonically decreasing function of occupied bandwidth.

11. The method of claim 8, further comprising:
    monitoring fence quanta of the transmitted signal prior to each transmission;
    determining when a fence quantum is occupied;
    reducing the transmitted signal occupied bandwidth during a subsequent transmission, in response to the fence quantum being occupied, thereby creating unoccupied fence quanta between the CR device transmission signal and each spectrally adjacent neighbor.

12. The method of claim 11, further comprising:
    determining when the CR device transmission signal occupies less bandwidth than one of its spectrally adjacent neighbors;
    forcing the larger spectral neighbor to reduce its occupied bandwidth more often, while the CR device increases its own occupied bandwidth;
    comparing cost of the increased occupied bandwidth to a cost tolerance threshold; and
    maintaining the increased occupied bandwidth within the cost tolerance threshold.

13. The method of claim 12, wherein the CR device occupies the fence quantum more often than a larger bandwidth neighbor based on the growth rate being a decreasing function of occupied bandwidth.

14. A cognitive radio (CR) network, comprising:
    a plurality of CR devices operating within a brokered spectrum, each CR device determining open spectrum segments and a cost associated therewith, each CR device selecting a desired portion of open spectrum based upon cost and each CR device transmitting and growing a narrowband signal within its respective selected open spectrum, wherein a CR device of the plurality of CR devices grows its respective narrowband signal until an occupied bandwidth proportional to a cost tolerance threshold associated with the selected portion of open spectrum is met.

15. The cognitive radio network of claim 14, wherein each CR device of the plurality of CR devices grows until:
    the occupied bandwidth of each CR device is equalized for all of the CR devices when all of the CR devices have the same cost tolerance to the cost criteria; or
    the occupied bandwidth of each CR device is proportional to its respective cost tolerance when the plurality of CR devices have differing cost tolerances.

16. The cognitive network of claim 14, wherein the cognitive network operates without a central controller.

17. The cognitive network of claim 14, wherein the CR device determines open spectrum segments by sampling the spectrum or querying a database.

18. The cognitive network of claim 14, wherein each CR device determines the cost of open spectrum segments based on the cost being pre-stored in a database internal to each CR device.

19. The cognitive network of claim 14, wherein each CR device determines the cost of open spectrum segments based on inquiries to brokers.

20. The cognitive network of claiml 14, wherein the cost of open spectrum segments is negotiated between a broker and CR user.

21. The cognitive network of claim 14, wherein the cost of open spectrum segments is negotiated between a broker and CR device.

* * * * *